Patented Mar. 22, 1938

2,111,863

UNITED STATES PATENT OFFICE 2,111,863

SECONDARY AMINES

Max M. Levine, Anniston, Ala., assignor, by mesne assignments, to Monsanto Chemical Company, a corporation of Delaware No Drawing. Application December 14, 1935, Serial No. 54,375

4 Claims. (Cl. 260—128)

This invention relates to a new class of organic amines and substitution products thereof and it relates more particularly to secondary amines, having as characterizing substituents, the 2,4-diphenyl phenyl group, which may be represented as follows:

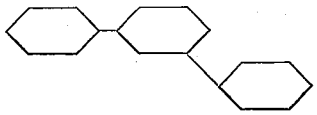

Generally speaking, the products contemplated by my invention are crystalline, and may have relatively high melting points when pure or substantially so. They are valuable as intermediates for the preparation of many organic compounds, including dyes wherein a secondary amine is required. In addition they possess marked antioxidant properties, which render them valuable in the various arts, including the rubber art and the paint and protective coating arts.

In general, the products are obtained by heating to the reaction temperature, 2,4-diphenylaniline, with a phenol or alcohol whereby water is eliminated and the secondary amine is formed. Following this procedure, one may use beta-naphthol, alpha-naphthol, phenol, chlorophenol, cresol, and other phenols.

Such primary alcohols as methyl, ethyl, propyl and benzyl alcohol may also be reacted with 2,4-diphenylaniline or the hydrochloride of diphenyl-aniline. The general or type formula of the new compounds may be represented graphically as follows:

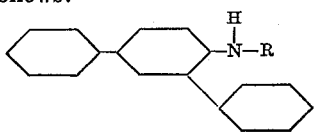

where R is a hydrocarbon or substituted hydrocarbon radical.

The preparation of 2,4-diphenyl aniline is relatively simple and may be effected by nitrating 2,4-diphenyl benzene

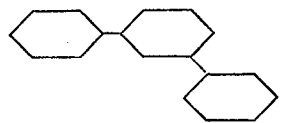

and then reducing the nitro compound with hydrogen or iron in the same manner as is employed to reduce nitrobenzene to aniline.

The new compounds are made conveniently by the following procedure:

The preparation of N-(2,4-diphenylphenyl)-beta-naphthyl-amine is typical of my invention and the following procedure for its preparation is exemplary of the entire class:

Fifty grams of 2,4-diphenyl-aniline, (which need not necessarily be absolutely pure, in fact, a material having a melting point of 66.8° C. in contrast to the pure product which melts at 76° C., will be found satisfactory for most of the preparations) and 23.5 grams of beta-naphthol (technical) are heated, preferably with agitation and in the presence of a condensing catalyst as for example, iodine. For this purpose .3 gram of iodine will be found sufficient. The reaction mixture is immersed in an oil bath maintained at 195–220° C. for nine hours. Evidence of reaction is observed at about 200° C. or even lower, and it is desirable that the temperature be raised slowly to about 220° toward the end of the reaction period.

The reaction mixture at room temperature is very viscous and resinous. The mixture is heated to 100° C. and poured into 250 cc. of alcohol. The N-(2,4-diphenylphenyl)-beta-naphthylamine crystallizes immediately while the unreacted constituents go into solution in the hot alcohol. The alcohol solution is filtered by suction and washed several times with hot alcohol. The yield of the dry crude amine is in the neighborhood of 90%. The crude amine is dissolved in 750 cc. of boiling benzol, the solution filtered and the filtrate allowed to crystallize over-night. The crystals are removed by filtration and washed with benzol several times. By successively evaporating and crystallizing the benzol filtrate several crops of crystals may be obtained.

In order to obtain a pure product the crystals obtained from the benzol solution may be recrystallized from toluol. The product which has been obtained in this way, melts at 200.4° C. to 200.8° C.

The diphenyl benzene from which the new compounds are derivable, constitutes a by-product in the preparation of diphenyl and heretofore it has even been burned in order to dispose of it. There has been but slight commercial demand for it. Accordingly, it can be obtained at but slight expense. The steps of nitrating and reducing it to 2,4-diphenyl aniline are simple and inexpensive and the same is also true of the subsequent step of condensing it with a hydroxy compound to form the secondary amine. The secondary amines, especially when they embrace the naphthalene group, are quite suitable for introduction into rubber compounds which are subsequently vulcanized to provide materials highly durable and resistant to ageing.

Although only the preferred embodiments of the invention have been shown and described, it is apparent these are merely given by way of example and that numerous modifications may be made therein without departure from the spirit of the invention or the scope of the appended claims.

What I claim is:

1. As a new chemical compound, the condensation product of 2,4-diphenylaniline and a hydroxy compound selected from the group consisting of methyl alcohol, ethyl alcohol, propyl alcohol, benzyl alcohol, naphthols, phenol, chlorophenols and cresols.

2. As a new chemical compound, the condensation product of 2,4-diphenylaniline and an aliphatic alcohol containing less than four carbon atoms in the molecule.

3. As a new chemical compound the condensation product of 2,4-diphenyl aniline and a phenol.

4. As a new chemical compound, N-(2,4-diphenylphenyl)-beta-naphthylamine, which when pure is a crystalline substance having a melting point of approximately 198.0° to 200.8° C.

MAX M. LEVINE.